Figure 1:
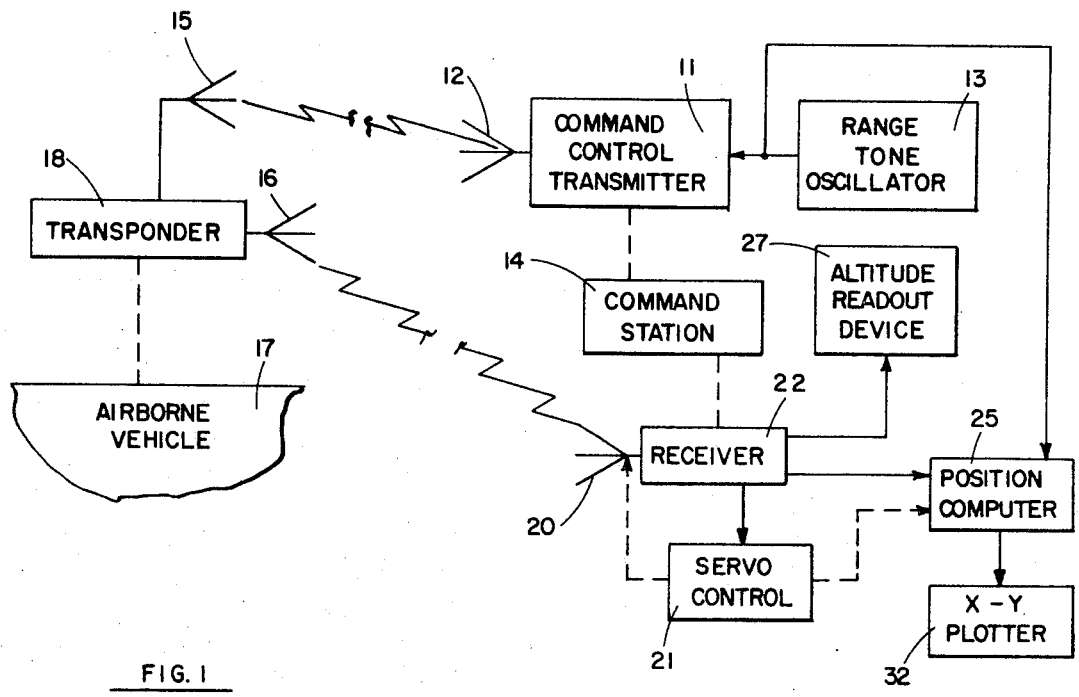

United States Patent [19]
Botzum et al.

[11] 3,739,378
[45] June 12, 1973

[54] RADIO TRACKING SYSTEM

[75] Inventors: Richard A. Botzum, Chania; Donald W. Peck, Newbury Park, both of Calif.

[73] Assignee: Northrop Corporation, Los Angeles, Calif.

[22] Filed: June 14, 1971

[21] Appl. No.: 152,765

[52] U.S. Cl. .......... 343/6.5 R, 343/11 R, 343/13 R, 343/17.7, 343/112 PT
[51] Int. Cl. ............................ G01s 7/04, G01s 9/06
[58] Field of Search .................. 343/6.5 R, 6.5 LC, 343/112 PT, 13, 17.7, 11 R

[56] References Cited
UNITED STATES PATENTS

| | | | |
|---|---|---|---|
| 3,075,190 | 1/1963 | Laporte | 343/112 PT |
| 3,409,888 | 11/1968 | Speer, Sr. | 343/6.5 R |
| 3,184,740 | 5/1965 | Huckabay et al. | 343/112 PT |
| 3,341,812 | 9/1967 | Perkinson et al. | 343/6.5 LC X |
| 3,181,154 | 4/1965 | Henne | 343/13 R |
| 3,165,739 | 1/1965 | Long et al. | 343/13 R |

*Primary Examiner*—Malcolm F. Hubler
*Attorney*—W. M. Graham

[57] ABSTRACT

A tracking system suitable for tracking a target from a command station includes a transponder on the target which transmits signals in response to signals received from a command control transmitter at the command station. The signals transmitted by the transponder are received by a receiver at the command station and a target range signal is developed in accordance with the time interval between the signal transmitted by the command control transmitter and that received by the receiver. The azimuth of the target is determined by means of a servo-control system which automatically locks the receiver antenna onto the target. Signals in accordance with target range and azimuth are processed in a position computer, the output of which is fed to an X-Y plotter which provides a continuous positional plot of the target.

9 Claims, 3 Drawing Figures

INVENTORS
RICHARD A. BOTZUM
DONALD W. PECK
BY
SOKOLSKI & WOHLGEMUTH
ATTORNEYS

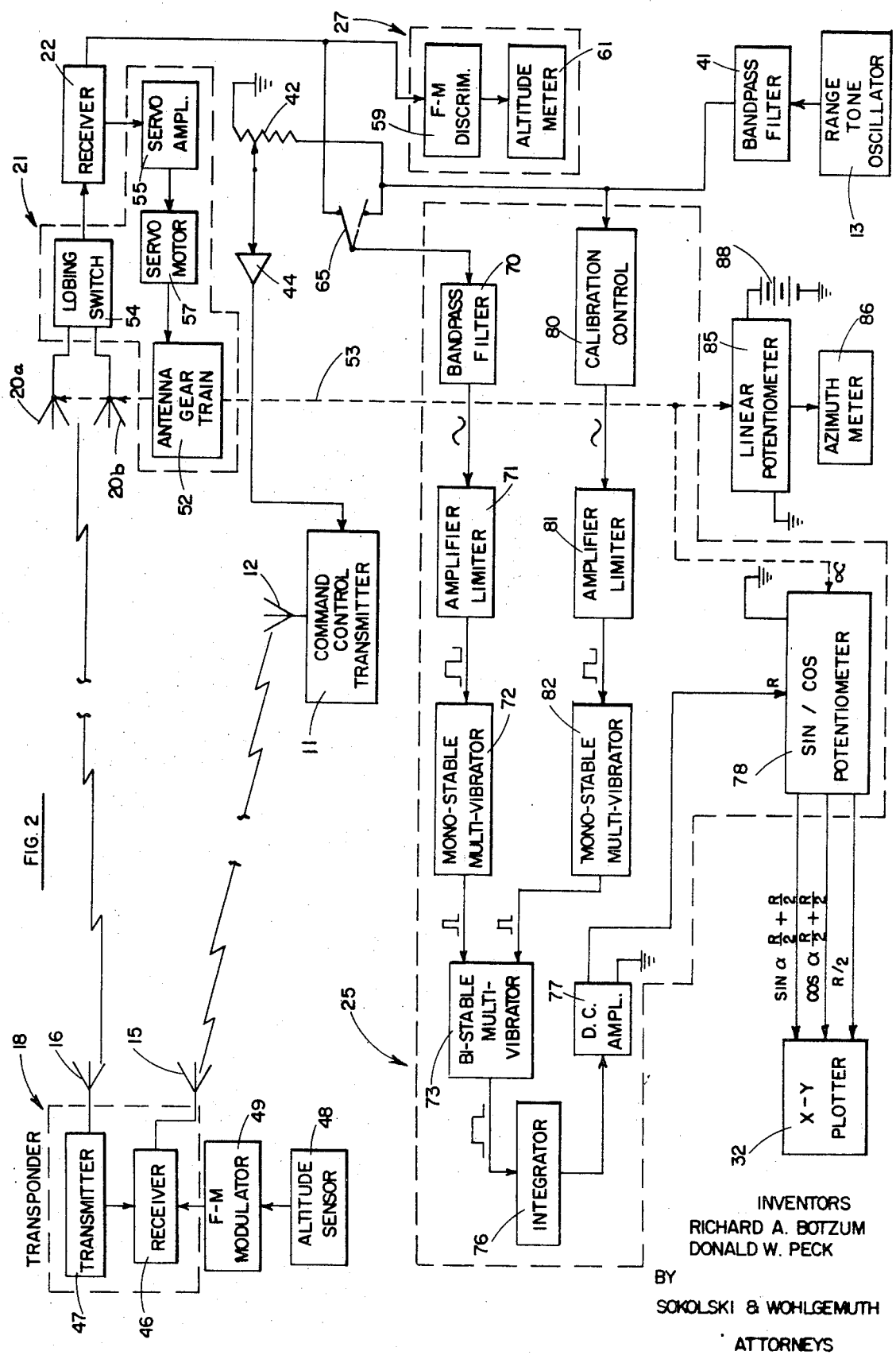

RADIO TRACKING SYSTEM

This invention relates to radio tracking systems, and more particularly to such a system capable of automatically providing a positional plot of a target carrying a transponder.

In various control functions, such as the control of drone aircraft, missiles, and manned aircraft, tracking and plotting systems are utilized to provide a continual readout indicative of the range, azimuth and altitude of the airborne vehicle. Such systems of the prior art which are capable of providing the necessary accuracy and comprehensive information for precise control functions generally are rather bulky, of considerable weight, and somewhat more complex and costly than to be desired. Further, in many of these systems, it is necessary to have complicated and expensive equipment not only at the ground station but also in the airborne vehicle. Also, in many of these prior art systems, target elevation information is not made available, or this information is derived by utilizing an antenna having elevational directive characteristics in conjunction with an elevation positioning and angle measuring system which further adds to the complexity and cost of the system. A great need exists for a tracking system which is relatively simple and economic in its construction, which is nevertheless capable of providing reasonably accurate plotting information for the necessary control functions. The device of this invention, it is believed, satisfies these requirements in providing a device which is of significantly lower cost and lesser complexity than prior art similar tracking systems. Further, the device of this invention is of relatively light weight portable construction, so that it can be set up for use in the field with relative ease. The significant decrease in the number of active components involved, and the greater simplicity of design of the present invention contribute to the greater reliability and ease of maintenance as well as economy. Further, with the system of this invention, a relatively simple lightweight transponder is all that is needed in the airborne vehicle, which greatly facilitates and economizes this portion of the installation.

It is therefore an object of this invention to provide an improved tracking and plotting system of greater simplicity and economy than prior art devices.

It is another object of this invention to provide a lightweight tracking and plotting system which can be handled with ease for field use.

It is another object of this invention to provide a reliable and accurate system for tracking and plotting airborne vehicles which is significantly more economical than prior art systems.

It is still a further object of this invention to provide a system for accurately tracking and plotting the position of airborne vehicles which has higher reliability than prior art systems in view of its relative simplicity of design.

Figure 3:
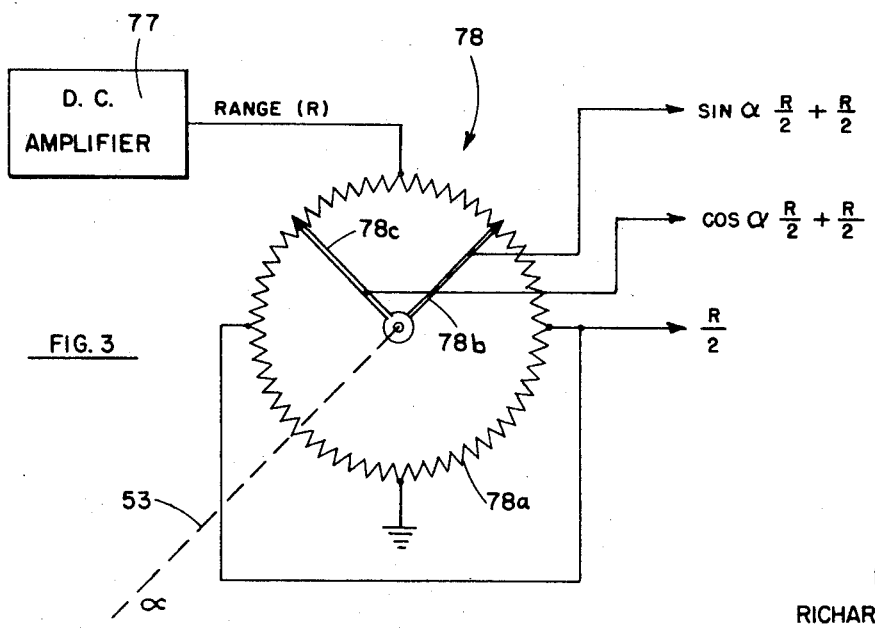

Other objects of this invention will become apparent as the description proceeds in connection with the accompanying drawings, of which:

FIG. 1 is a functional block diagram illustrating the basic features of the system of the invention, FIG. 2 is a functional block diagram illustrating a preferred embodiment of the system of the invention, and FIG. 3 is a schematic drawing illustrating the generation of the X-Y plotting signals in the preferred embodiment.

Briefly described, the device of the invention includes a command control transmitter located at a command station for transmitting continuous tone signals modulated on an RF carrier. A transponder is provided on the airborne vehicle to be tracked, which receives the command control transmitter signal and immediately retransmits the modulation signal on its own carrier. The signals transmitted from the transponder are received by receiver means at the command station. Such receiver means includes a directive antenna which is positioned by means of a servo-control system so that it remains locked on in azimuth to the signals transmitted by the transponder at all times. A signal in accordance with the transit time of the signals to and from the airborne vehicle is generated in the position computer, and this signal combined with signals in accordance with the azimuth of the vehicle to provide X-Y positional information. This information is fed from the position computer to an X-Y plotter, where it is used to plot a track of the vehicle's position.

Referring now to FIG. 1, the basic operation of the system of the invention is illustrated. Radio signals are generated by means of command control transmitter 11 and these signals, modulated by the output of range tone oscillator 13, are radiated by means of transmitting antenna 12. Antenna 12 may be non-directional. The signals transmitted by the antenna, as to be more fully explained in connection with FIG. 2, include a tone signal in the audio frequency range modulated on the radio frequency carrier. The signals radiated by antenna 12 from command station 14 are received by antenna 15 which is located on airborne vehicle 17. The signals received by antenna 15 are conveyed to the receiver of transponder 18, the detected output of this receiver immediately being retransmitted by the transmitter of the transponder. The transmitter of transponder 18 transmits the received audio signal modulated on its own carrier by means of antenna 16. This signal is received by directional antenna 20 located at the command station. Antenna 20 is slewed in azimuth by means of servocontrol 21 which operates in response to the received signal as processed in receiver 22, to maintain antenna 20 oriented in the direction of airborne vehicle 17 at all times.

Servo control 21 provides a signal indicative of the azimuth of antenna 20 and thus of the azimuth of airborne vehicle 17, to position computer 25. Receiver 22 provides a signal to position computer 25 in accordance with the combined transit times of the signals transmitted to and from transponder 18, the output of the position computer 25 thus being indicative of the range of vehicle 17 from the command station. Receiver 22 also provides an altitude readout signal to altitude readout device 27, this signal being in accordance with barometric pressure information transmitted from vehicle 17 by means of transponder 18. Information in accordance with range and azimuth of the target is fed from position computer 25 to X-Y plotter 32 where it is utilized to provide a continuous plot of target position.

Referring now to FIG. 2, a preferred embodiment of the system of the invention is illustrated. Range tone oscillator 13, which may comprise a tuning fork, provides a signal in the audio frequency range which may, for example, be 1.3 kHz. The output of range tone oscillator 13 is fed through band pass filter 41 to potentiometer 42. Band pass filter operates to filter out harmonics and other spurious radiations in the output of the oscillator to provide a signal which approximates a pure sine wave. Potentiometer 42 is utilized to adjust the amplitude of the signal to a suitable level, this signal being fed from the arm of the potentiometer through amplifier 44 to command control transmitter 11, as a modulation signal therefor. Typically, command control transmitter provides a radio frequency output in the UHF range (about 500 mHz), this signal being modulated with the 1.3 kHz tone. The output of command control transmitter 11 is radiated by means of antenna 12 which may be non-directional.

The signals radiated by antenna 12 are received by means of antenna 15 which is located on the airborne vehicle. Antenna 15 also may be non-directional in its characteristics. The signals received by antenna 15 are fed to receiver 46 of transponder 18, the tone signal being detected by the receiver and fed to transmitter 47 to provide a modulation signal therefor.

Information in accordance with vehicle altitude is sensed by means of altitude sensor 48 which may comprise a barometric sensor device. The output of altitude sensor 48 is fed to FM modulator 49 which provides a signal in accordance with vehicle altitude for frequency modulating transmitter 47.

The signals transmitted by transmitter 47 are radiated by means of antenna 16. The radio frequency energy radiated by antenna 16 is received by antennas 20a and 20b, which are a pair of directional antennas capable of being trained in azimuth. These antennas are suitably mounted for rotatable azimuth drive by means of antenna gear train 52. The RF outputs of antennas 20a and 20b are fed through lobing switch 54 to receiver 22. Lobing switch 54 may be of a typical conventional design which alternately feeds an output signal first from one and then from the other of antennas 20a and 20b to receiver 22, the amplitudes of the outputs of the two antennas being indicative of the positions of the antennas relative to the airborne vehicle. Thus, for example, when the antennas are aligned with the airborne target they will both receive equal amplitude signals therefrom, while with a misalignment to the right, antenna 20b will receive a greater signal, while with a misalignment to the left, antenna 20a will receive a greater signal. The signals received by antennas 20a and 20b are detected and the detected outputs compared in receiver 22 and a servo-control signal in accordance with any difference therebetween fed from the receiver to servo amplifier 55. Servo amplifier 55 amplifies any such "error" signal, this error signal being utilized to drive servo motor 57. The servo motor in turn drives the antenna gear train 52 in a direction such as to minimize the error signal. Thus, the various components of servo control 21 operate to maintain antennas 20a and 20b automatically trained on the airborne target at all times.

The detected output of receiver 22 is also fed to FM discriminator 59 which detects the altitude signal modulated onto the carrier of transmitter 47. The output of FM discriminator 59 in accordance with the altitude of the airborne vehicle is fed to an altitude meter 61 for readout. Altitude meter 61 may comprise a conventional, suitably calibrated direct current meter. The detected output of receiver 22 is also fed through switch 65 to band pass filter 70 of the position computer 25. Filter 70 filters out the tone oscillator signal from the detected output of the receiver and feeds this signal to amplifier-limiter 71 where the signal is appropriately limited to provide a square wave. The square wave output of amplifier limiter 71 is fed to monostable multivibrator 72 and operates to actuate this multivibrator so as to provide a drive signal for bistable multivibrator 73. Thus, bistable multivibrator 73 is driven to a first state in response to the leading edge of the tone signal received by receiver 22 from transponder 18.

The output of range tone oscillator 13 is also fed through band pass filter 41 to calibration control 80 which may comprise a phase shifter. The signal is then fed through amplifier-limiter 81 and monostable multivibrator 82 to provide an actuation signal for bistable multivibrator 73. The output of monostable multivibrator 82 operates to drive bistable multivibrator 73 to a second state opposite to that which the output of monostable multivibrator 72 drives the bistable multivibrator. Amplifier-limiter 81 operates to square the sine wave input while monostable multivibrator 82 operates to provide a sharp signal in response to the leading edge of the output of amplifier-limiter 81, in the same manner as just described in connection with amplifier-limiter 71 and monostable multivibrator 72. Thus, bistable multivibrator 73 will have an output signal with a pulse width in accordance with relative times of occurrence of the inputs thereto from monostable multivibrators 72 and 82. With proper adjustment of calibration control 80, the output of bistable multivibrator 73 is a signal having a pulse width in accordance with the transit time of the signals going to and from the transponder, this signal thus being in accordance with the range of the target.

Calibration control 80 is utilized to calibrate the circuit for accurate operation by throwing switch 65 to the position indicated by the dotted line, in which case both the circuit including monostable multivibrator 72 and that including monostable multivibrator 82 are both receiving the immediate output of range tone oscillator 13. Under such conditions, calibration control 80, which, as already noted, may comprise a phase shifter, is adjusted until the outputs of both monostable multivibrators are in phase coincidence so that the output of bistable multivibrator 73 has a minimum pulse width.

The square wave output of bistable multivibrator 73, which as already noted is in accordance with the range of the target, is fed to integrator 76 which develops a DC signal in accordance with this range. This DC signal is amplified by means of DC amplifier 77 and fed to sine/cosine potentiometer 78. The operation of the sine/cosine potentiometer will be described more fully in connection with FIG. 3. Suffice it to say at this point that this potentiometer includes a pair of arms, one representing a cosine function, the other representing a sine function, which are driven by mechanical drive 53 in response to the antenna gear train 52 so as to generate an electrical signal in accordance with the azimuthal position of antennas 20a and 20b. This azimuth signal is effectively multiplied in the potentiometer by the output of DC amplifier 77, which is in accordance with the range of the target. Output signals are fed from sine/cosine potentiometer 78 to X–Y plotter 32 in accordance with the X and Y coordinate positions of the target, these positions being represented by sine $\alpha R/2$ and cosine $\alpha R/2$ respectively, with $\alpha$ being indicative of the azimuth of the target and R the range of the target.

A reading is also provided in accordance with the azimuth of the target on azimuth meter 86, this meter operating in response to the output of linear potentiometer 85. Potentiometer 85 receives a reference signal from DC source 88, its arm being driven in response to antenna gear train 52. Thus, a DC signal is generated at the arm of the potentiometer in accordance with the azimuthal position of the antennas.

Referring now to FIG. 3, the operation of the sine/cosine potentiometer of the device of the invention in developing the signals for use in the plotter is schematically illustrated. Potentiometer 78 may comprise a circular resistance element 78a, and a pair of arm units 78b and 78c which wipe on element 78a in electrical contact therewith. Arms 78b and 78c are arranged in space quadrature. The output of DC amplifier 77 in accordance with range (R) is fed to the position on element 78a representing 0°. The 180° position of element 78a is grounded while the 90° and 270° positions are connected together to provide a common output in accordance with R/2. Arms 78b and 78c which are electrically insulated from each other are driven by mechanical output 53 of antenna gear train 52. Thus, it should be readily apparent that the output signals at arms 78b and 78c are quadrature related signals in accordance with $\sin \alpha R/2 + R/2$ and $\cos \alpha R/2 + R/2$, respectively. These signals are fed to X-Y plotter 32, using the R/2 output as the common reference therefor to provide the "X" and "Y" plotter signals; the R/2, of course, is eliminated by virtue of the fact that this very same signal is used as the common reference. Appropriate scaling can be provided to compensate for the halving introduced in the potentiometer. Thus, potentiometer 78 provides a convenient and simple technique for developing the plotting signal without requiring an inverting amplifier as is commonly used in prior art similar devices.

While the system of the invention has been described and illustrated in detail, it is to be clearly understood that this is intended by way of illustration and example only and is not to be taken by way of limitation, the spirit and scope of this invention being limited only by the terms of the following claims.

We claim:

1. A system for tracking and plotting the position of an airborne vehicle from a command station comprising:
    a control transmitter at said command station for generating radio signals,
    tone oscillator means for providing a modulation signal for said radio signals,
    antenna means at said station for radiating said radio signals,
    antenna means on said vehicle for receiving the signals radiated from said station,
    transponder means on said vehicle including a receiver for detecting the signals from said vehicle antenna means and a radio transmitter for instantaneously retransmitting the detected signals, said retransmitted signals being radiated by said vehicle antenna means,
    directive antenna means at said command station for receiving the signals radiated by said vehicle antenna means,
    receiver means at said command station for detecting the signals received by the directive antenna means,
    servo control means responsive to the output of said receiver means for slewing the directive antenna means so as to maintain azimuthal lock on with said vehicle,
    position computer means responsive to the output of said receiver means for generating a signal in accordance with the vehicle range from the command station comprising a bistable multivibrator, said multivibrator being driven to a first state in response to the leading edge of the local range tone oscillator output and to a second state by the leading edge of the tone signal demodulated from the output of said receiver means, said multivibrator generating a pulse having a width in accordance with vehicle range, said position computer means further receiving a signal from said servo-control means in accordance with the azimuth of said vehicle from the command station, said computer means further including means for multiplying the range and azimuth signals, and
    plotting means responsive to the output of said computer means for plotting the position of the target.

2. The system of claim 1 wherein the means for multiplying the range and azimuth signals comprises a potentiometer having a fixed resistance element and a pair of quadrature related wiper arms electrically engaging said fixed element, the range signal being coupled to the fixed element, signal from said servo control means mechanically driving said arms in accordance with the slewing of the directive antenna means, said plotting means receiving signals in X-Y coordinates from the potentiometer arms.

3. The system of claim 2 wherein said range signal is coupled to the fixed element of said potentiometer between points therealong representing the 0° and 180° azimuthal positions, the 90° and 270° azimuthal points along said fixed element being connected together and fed to said plotter as a common return for the signals fed thereto from the potentiometer arms.

4. The system of claim 1 and further including altitude sensor means on said vehicle for generating a signal in accordance with vehicle altitude means for modulating the signals transmitted by the transponder with the vehicle altitude signal, and means at said command station for detecting and providing a readout of said vehicle altitude signal.

5. The system of claim 1 and further including means for integrating the multivibrator pulse to provide a DC signal in accordance with vehicle range.

6. The system of claim 1 and further including means for calibrating the range operation of said computer means including means for adjusting the phase of the local range tone oscillator output fed to said multivibrator.

7. In a system for tracking and plotting the position of an airborne vehicle from a command station, said system comprising control transmitter means at said station for generating and transmitting radio signals, transponder means on the vehicle for receiving and immediately retransmitting signals received from control transmitter, directive antenna means at said station for receiving the retransmitted signals, receiver means for detecting the signals received by said directive antenna means, servo means for automatically positioning the directive antenna means so as to maintain antenna lock-on with the vehicle and plotter means for plotting vehicle position, position computer means including:

means responsive to the detector output of the receiver means for generating a DC signal in accordance with the range of the vehicle from the command station, and a potentiometer having a fixed resistance element and a pair of quadrature related wiper arms electrically engaging said fixed element, the DC range signal being coupled to the fixed element between points therealong representing 0° and 180° azimuthal positions, the 90° and 270° azimuthal points along said fixed element being connected together to provide a common return for the signals developed at said wiper arms, said servo means being connected to position said wiper arms in accordance with the position of the directive antenna means, the arms of said potentiometer and said common return being connected to said plotter to provide plotting signals thereto in X–Y coordinates.

8. The system of claim 7 wherein said means for generating a DC signal in accordance with vehicle range includes a bistable multivibrator, means for driving said multivibrator to a first state in accordance with the phase of the signals transmitted by said control transmitter and to a second state in accordance with the signals detected by said receiver means, and means for integrating the pulse output of said multivibrator.

9. The system of claim 7 wherein said fixed resistance element is circular.

* * * * *